July 3, 1928.
O. C. REEVES
PACKING CASE
Filed Dec. 3, 1923
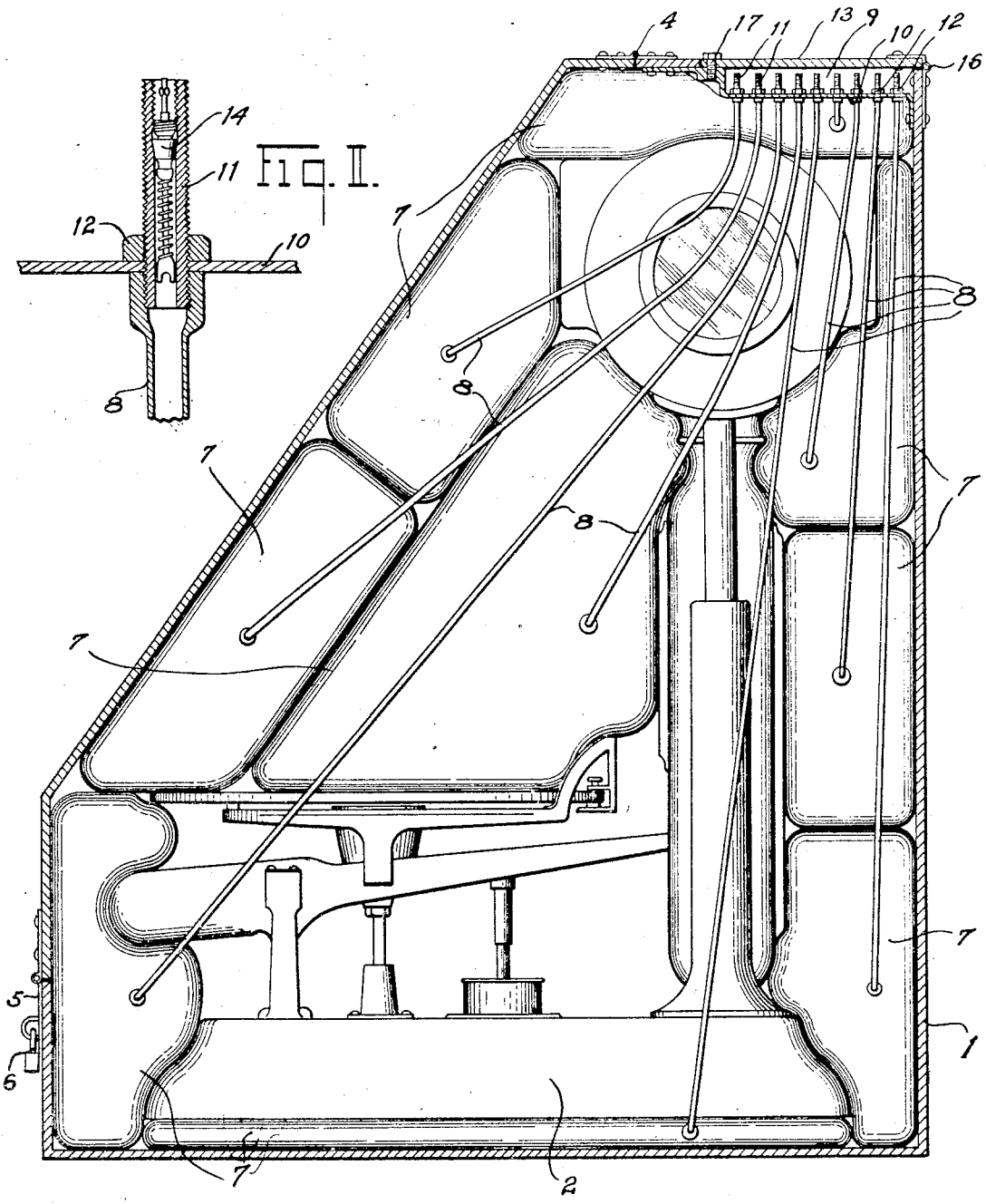
Fig. II.
Fig. I.
Inventor
Orwell C. Reeves.
By C. W. Marshall.
Attorney Patented July 3, 1928.

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

PACKING CASE.

Application filed December 3, 1923. Serial No. 678,084.

This invention relates to packing cases for heavy articles and machines of somewhat fragile nature, such as weighing scales.

One of the principal objects of my invention is the provision of means for securely yet yieldably holding an article in place in a packing case in such a manner as to reduce the probability of its being injured by sudden jars such as occur when the case is roughly handled.

Another object is the provision of means to so support an article in the case that it will not lie against nor be supported by a portion of the walls of the case.

Another object is the provision of a packing case embodying a resilient supporting means for the article which is adapted to conform substantially to the contour of the article.

Another object is the provision of pneumatic means for retaining an article in a case, which means may be inflated or deflated without disturbing the case or its contents.

Still another object is to provide a method of packing which necessitates little effort on the part of the workman, as a supply of air pressure is all that is required, in lieu of the usual packing materials, such as excelsior, batting, cotton waste, etc., which are necessarily expensive when used in large quantities.

And still another object is the provision of a packing case with packing of light weight, thus cutting down the cost of transportation of the article shipped and making it practicable for the case and packing to be employed a number of times for the transportation of articles, thus obviating the costly practice of destroying the case and the cushioning medium, which is usually of no material value to the person receiving it.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a vertical sectional view through a packing case showing a weighing scale of a well known type in position for transportation; and Figure II is an enlarged fragmentary sectional view through one of the connections, showing an automatic valve therein.

Referring to the drawings, I have shown my invention as embodied in a packing case 1, preferably fabricated of metal to withstand rough handling, and which is so shaped as to conform substantially with the contour of the weighing scale 2 of a well known type, the case in the illustration shown assuming the form of a prismoid. It is to be understood that my invention is susceptible to change and modification to accommodate weighing scales of any shape or size, the embodiment shown being for purposes of illustration only.

The front portion 3 of the case 1 is hinged, as at 4, to provide suitable access to the case, the lower extremity of the hinged portion 3 being provided with a hasp 5 and a lock 6 to prevent tampering with the case or its contents and also to insure a positive closure of the case.

Surrounding the scale so that it is retained out of contact with any portion of the walls of the case is a plurality of cushions 7 of rubber or other flexible material, each having a tubular connection 8 leading to a depression 9 in the upper portion of the case 1. A plate 10 forming the lower wall of the depression contains a plurality of openings to receive the free ends 11 of the connections 8 which are retained therein by means of the nuts 12. The ends 11 of the connections 8 are fitted with automatic valves 14 of a well known type similar to the valves employed in the stems of pneumatic tubes for automobile tires (see Figure II), and, as they are not per se of my invention, they will not be described in detail.

A cover 13 is provided to enclose the depression 9, one end being hinged, as at 16, to facilitate the opening thereof, the free end being normally held in place by means of a threaded member 17.

In the operation of packing a scale for shipment, the cushions 7 are first partially inflated. This may be accomplished by connecting the ends 11 of the connections 8 to a source of air pressure—for example, as to a nozzle of an air supply tube ordinarily employed in inflating automobile tires, etc. The scale is then disposed within the case, the cushions 7 arranged in their proper positions, the hinged cover 3 closed and secured by means of the lock 6, and air pressure subsequently applied, causing the cushions 7 to be dilated until the scale is securely held in position. The air is retained within the cushions upon disconnecting the air supply by means of the valves 14 in the ends 11 of the connections 8.

It will be obvious from the foregoing description that the pressure within the cushions 7 is sufficient to securely yet resiliently hold the scale in its central position relative to the case and any tendency for the scale to change its position resulting from rough handling of the case will be absorbed by the cushions 7, thus precluding any damage which might result to the scale through the ordinary handling of the packing case during its transportations.

The embodiment of my invention herein shown and described is to be regarded as illustrative only, and it is to be understood that the invention is susceptible to modification, variation and change within the spirit and scope of the subjoined claims.

Having described my invention, I claim:

1. The combination with a packing case for weighing scales, of a plurality of pneumatic supporting cushions disposed therein, each of said cushions having an individual inflation tube leading to a point readily accessible from the exterior of said case.

2. In a device of the class described, in combination, a packing case having an opening, a cover for said opening, a plurality of pneumatic cushions of different sizes and shapes disposed in said case to fit around an article packed therein, and connections from said cushions to points readily accessible from the exterior of said case for inflating or deflating said cushions.

3. The combination in a packing case for weighing scales, of a plurality of flexible pneumatic cushions arranged therein, a compartment extending into said case from the exterior thereof, inflating tubes extending from said cushions into said compartment, and an exterior door for said compartment.

ORWELL C. REEVES.